US008520500B2

(12) United States Patent
Lin et al.

(10) Patent No.: US 8,520,500 B2
(45) Date of Patent: Aug. 27, 2013

(54) BUFFERED DEMOD AND DEMAP FUNCTIONS

(75) Inventors: Jeremy H. Lin, San Diego, CA (US); Arunava Chaudhuri, San Diego, CA (US); Raghu N. Challa, San Diego, CA (US); Hemanth Sampath, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 202 days.

(21) Appl. No.: 12/407,482

(22) Filed: Mar. 19, 2009

(65) Prior Publication Data

US 2009/0245091 A1 Oct. 1, 2009

Related U.S. Application Data

(60) Provisional application No. 61/040,452, filed on Mar. 28, 2008.

(51) Int. Cl.
*H04J 11/00* (2006.01)

(52) U.S. Cl.
USPC .......... 370/210

(58) Field of Classification Search
CPC .......... H04L 27/2647
USPC .......... 370/203–211
See application file for complete search history.

(56) References Cited

U.S. PATENT DOCUMENTS 5,864,577 A * 1/1999 Ramel .......... 375/130
7,315,934 B2 * 1/2008 Morishita et al. .......... 712/11
7,586,834 B2 * 9/2009 Byun et al. .......... 370/208
7,672,221 B2 * 3/2010 Fuji et al. .......... 370/210
7,697,410 B2 * 4/2010 Belotserkovsky et al. ... 370/206
7,751,510 B2 * 7/2010 Budianu et al. .......... 375/346
7,773,499 B2 * 8/2010 Hart et al. .......... 370/206
7,839,822 B2 * 11/2010 Yang et al. .......... 370/329
7,852,744 B2 * 12/2010 Palanki .......... 370/204
2002/0085648 A1 7/2002 Burns et al.
2005/0135308 A1 * 6/2005 Vijayan et al. .......... 370/330

(Continued)

FOREIGN PATENT DOCUMENTS

CN 1640030 A 7/2005
EP 1863226 12/2007

(Continued)

OTHER PUBLICATIONS

International Search Report and Written Opinion—International Searching Authority; PCT/US2009/03853; Oct. 6, 2009.

(Continued)

*Primary Examiner* — Ricky Ngo
*Assistant Examiner* — Ben H Liu
(74) *Attorney, Agent, or Firm* — Abdollah Katbab

(57) ABSTRACT

An apparatus operable in a wireless communication system, the apparatus may include an FFT symbol buffer and a demapping device. The FFT symbol buffer can feed FFT symbol data derived from received communication signals to a channel estimation device and a shared buffer. The channel estimation device can also provide intermediate data to the shared buffer. The intermediate data may be in tile form and can be derived from the FFT symbol data. Further, the intermediate data can be stored in the shared buffer. The demapping device can extract the intermediate data from the shared buffer in various forms including sub-packet form.

35 Claims, 9 Drawing Sheets

110
112
118
116
120
104
106
108
126
122
124
100
114

(56) References Cited

U.S. PATENT DOCUMENTS

| | | | | |
|---|---|---|---|---|
| 2006/0203710 | A1* | 9/2006 | Mukkavilli et al. | 370/208 |
| 2006/0224650 | A1* | 10/2006 | Cousineau | 708/400 |
| 2006/0269006 | A1 | 11/2006 | Kuroda | |
| 2007/0025460 | A1* | 2/2007 | Budianu et al. | 375/260 |
| 2007/0070953 | A1* | 3/2007 | Yoon et al. | 370/334 |
| 2008/0170545 | A1* | 7/2008 | Kim et al. | 370/329 |
| 2008/0240159 | A1* | 10/2008 | Palanki et al. | 370/474 |
| 2008/0250294 | A1* | 10/2008 | Ngo et al. | 714/752 |
| 2009/0191835 | A1* | 7/2009 | Lozano et al. | 455/334 |

FOREIGN PATENT DOCUMENTS

| | | | |
|---|---|---|---|
| JP | 2005535223 | A | 11/2005 |
| JP | 2006279590 | A | 10/2006 |
| JP | 2006528847 | | 12/2006 |
| WO | WO2004013999 | | 2/2004 |
| WO | 2005011128 | A1 | 2/2005 |
| WO | WO2006099526 | A2 | 9/2006 |
| WO | WO2007137201 | | 11/2007 |

OTHER PUBLICATIONS

Nilsson A, et al. "Design methodology for memory-efficient multi-standard baseband processors"; Communications, 2005 Asia-Pacific Conference on Perth, Western Australia, 2005; Piscataway, NJ, USA, IEEE, Oct. 3, 2005; pp. 28-32, XP010860734.

Taiwan Search Report—TW098110244—TIPO—Apr. 1, 2012.

Nishi K., et al., "Small-Area Variable-Length FFT Processor for OFDM Wireless LAN Systems Based on IEEE802.11n Draft," Technical Report of the Institute of Electronics, Information and Communication Engineers, Nov. 22, 2006, vol. 106, No. 395, pp. 105-109, SR2005-56.

Yoshizawa S., et al., "VLSI Architecture of a Pipelined MMSE Detector in a 4×4 MIMO-OFDM Receiver," Technical Report of the Institute of Electronics, Information and Communication Engineers, Jun. 5, 2008, vol. 108, No. 85, pp. 47-52, SIS2008-9.

* cited by examiner

Tile 127
Tile 1
Tile 0
16 Tones
8 OFDM Sym
P1
P2
P3
A5 B9
C4 A9
B4 C8
A4 B8
C3 A8
B3 C7
A3 B7
C2 A7
B2 C6
A2 B6
C1 A6
B1 C5
A1 B5 C9
Data
Pilot

BUFFERED DEMOD AND DEMAP FUNCTIONS

CLAIM OF PRIORITY UNDER 35 U.S.C. §119

The present application for patent claims priority to Provisional Application No. 61/040,452 entitled "EFFICIENT TILE RAM TO DECOUPLE DEMOD AND DEMAP FUNCTIONS" filed Mar. 28, 2008, and assigned to the assignee hereof and hereby expressly incorporated by reference herein.

FIELD OF DISCLOSURE

The invention relates to communications in a telecommunications system, and more particularly to an efficient tile Random Access Memory (RAM) to decouple the demodulate and demapping functions in a telecommunications system.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels; where $N_S \leqq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

In a wireless communication system such as an OFDMA system, it may be desireable to estimate the response of a wireless channel from a transmitter to a receiver. The channel estimate may be used for various purposes such as data detection, time synchronization, frequency correction, spatial processing, rate selection, and so on. Channel estimation may be performed by transmitting a pilot signal containing pilot symbols that are known a priori by both the transmitter and receiver. The receiver can then estimate the channel gains as a ratio of the received pilot symbols over the known pilot symbols.

The pilot signal may be impaired by both noise and interference. These impairments can degrade the quality of the channel estimate obtained by the receiver based on the received pilot signal. The noise can come from various sources such as the wireless channel, receiver properties, and so on. Noise impairment can normally be addressed by transmitting the pilot signal in a proper manner and/or for a sufficient period of time such that the receiver can obtain the desired quality for the channel estimate. The interference can result from multiple transmitters transmitting their pilot signals simultaneously. These transmitters may be for different base stations in the system, different antennas of the same base station, and so on. The pilot signal from each transmitter may act as interference to the pilot signals from other transmitters. This pilot interference degrades the quality of the channel estimate.

It is often desired to estimate the channel and the level of interference. On the forward link (FL), common pilot symbols have been used. In the OFDMA system, such common pilot symbols may be scattered over the entire bandwidth shared by all the users. However, channel estimation can invoke a large number of computations and may impact system performance and resource allocation.

Further, in conventional receiver architectures, a demodulator and a demapper are often utilized and have been integrated into a single device even though the two devices may operate independently. For example, the demodulator and the demapper operate on two different timelines; the demapper may operate on a sub-packet timeline and the demodulator may operate on a tone-by-tone or tile-by-tile timeline. As a result, a need exists for decoupling the demodulator and the demapper in a receiver architecture via the use of a shared buffer resulting in two independent devices.

SUMMARY

Exemplary embodiments of the invention are directed to wireless communication systems and methods for the processing of communication signals.

Accordingly an embodiment can include an apparatus operable in a wireless communication system, the apparatus comprising: an FFT symbol buffer feeding FFT symbol data derived from received communication signals; a channel estimation device; a shared buffer, wherein the channel estimation device provides intermediate data, derived from the FFT symbol data, to the shared buffer; and a demapping device configured to extract the intermediate data from the shared buffer.

Another embodiment includes a method in a wireless communication system, the method comprising: feeding FFT symbol data derived from received communication signals, to a channel estimation device and a shared buffer, wherein the channel estimation device provides intermediate data, derived from the FFT symbol data, to the shared buffer; and providing the intermediate data from the shared buffer to a demapping device.

Another embodiment includes a computer-readable medium having instructions, which when executed by at least one processor, operates to provide processing of communication signals, the computer-readable medium comprising: instructions to feed FFT symbol data derived from received communication signals, to a channel estimation device and a shared buffer, wherein the channel estimation device provides intermediate data, derived from the FFT symbol data, to the shared buffer; and instructions to provide the intermediate data from the shared buffer to a demapping device.

Another embodiment includes an apparatus in a wireless communication system, the apparatus comprising: means for feeding FFT symbol data derived from received communication signals, to a channel estimation device and a shared buffer, wherein the channel estimation device provides intermediate data, derived from the FFT symbol data, to the shared buffer; and means for providing the intermediate data from the shared buffer to a demapping device.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
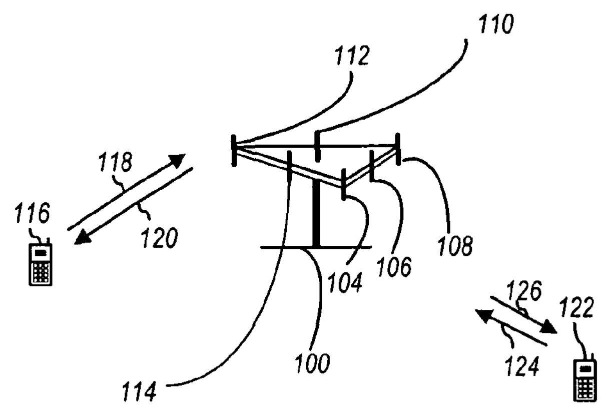
FIG. 1 illustrates a multiple access wireless communication system according to one embodiment.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization, is a technique that has similar performance and essentially the same overall complexity as that of an OFDMA system. SC-FDMA signals have a lower peak-to-average power ratio (PAPR) because of its inherent single carrier structure. SC-FDMA has drawn great attention; especially regarding uplink communications where a lower PAPR greatly benefits the mobile terminal in terms of transmit power efficiency. Currently, it is a working assumption for an uplink multiple access scheme in 3GPP Long Term Evolution (LTE), or Evolved UTRA that SC-FDMA be utilized.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Referring to FIG. 1, a multiple access wireless communication system according to one embodiment is illustrated. An access point 100 (AP) may include multiple antenna groups; one including antenna elements 104 and 106, another including antenna elements 108 and 110, and an additional including antenna elements 112 and 114. In FIG. 1, only two antennas are shown for each antenna group, however it is understood by one of ordinary skill in the art, that more or fewer antennas may be utilized for each antenna group. Access terminal 116 (AT) is in communication with antenna elements 112 and 114, where antenna elements 112 and 114 transmit information to access terminal 116 over forward link 120 and receive information from access terminal 116 over reverse link 118. Access terminal 122 is in communication with antenna elements 106 and 108, whereas antenna elements 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals, scattered randomly through its coverage area, causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
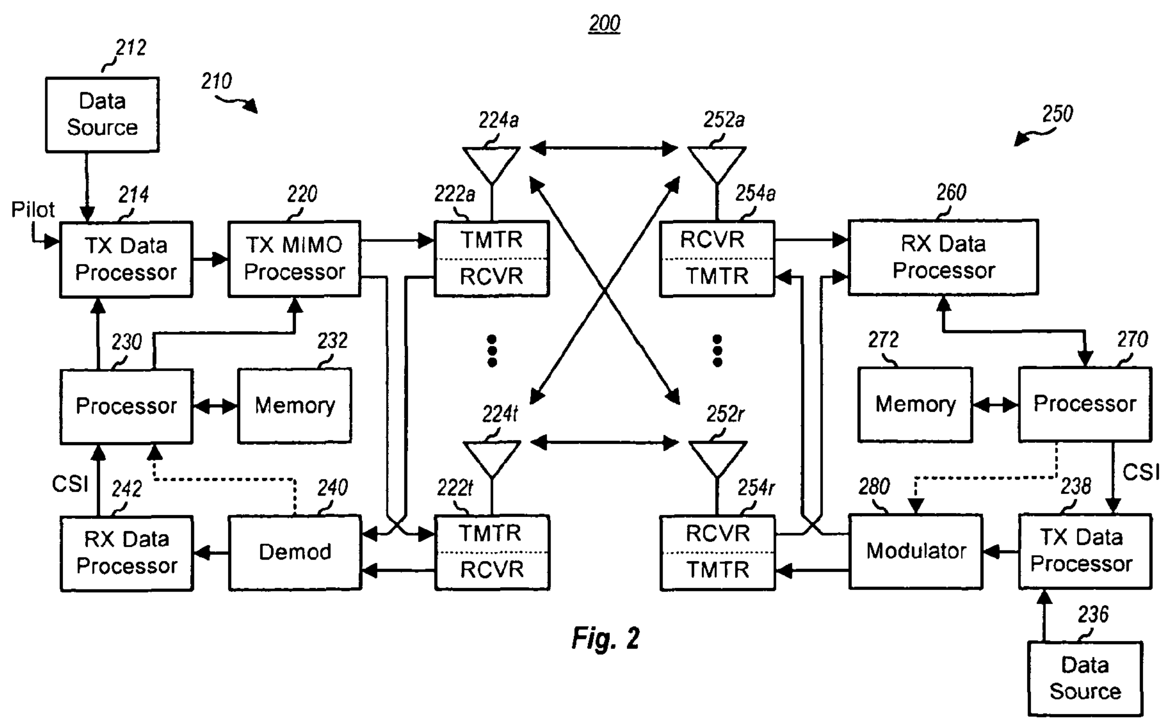
FIG. 2 is a block diagram of a communication system.

FIG. 2 is a block diagram of an embodiment of an AP 210 (also known as the access point) and an AT 250 (also known as access terminal) in a MIMO system 200. At the AP 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At 250, the transmitted modulated signals are received by $N_R$ antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from the $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at AP 210.

A processor 270 provides control to the AT 250 and provides an interface to memory 272, RX Data processor 260 and TX Data processor 238. A TX data processor 238 receives traffic data for a number of data streams from a data source 236, modulated by a modulator 280, conditioned by transmitters 254*a* through 254*r*, and transmitted back to AP 210.

At AP 210, the modulated signals from AT 250 are received by antennas 224, conditioned by receivers 222, demodulated by a demodulator 240, and processed by a RX data processor 242 to extract the reverse link message transmitted by the AT 250. Processor 230 then determines which pre-coding matrix to use for determining the beamforming weights then processes the extracted message. A processor 230 provides control to the AP 210 and provides an interface to memory 232, TX Data processor 214 and TX MIMO Processor 220.

Figure 3:
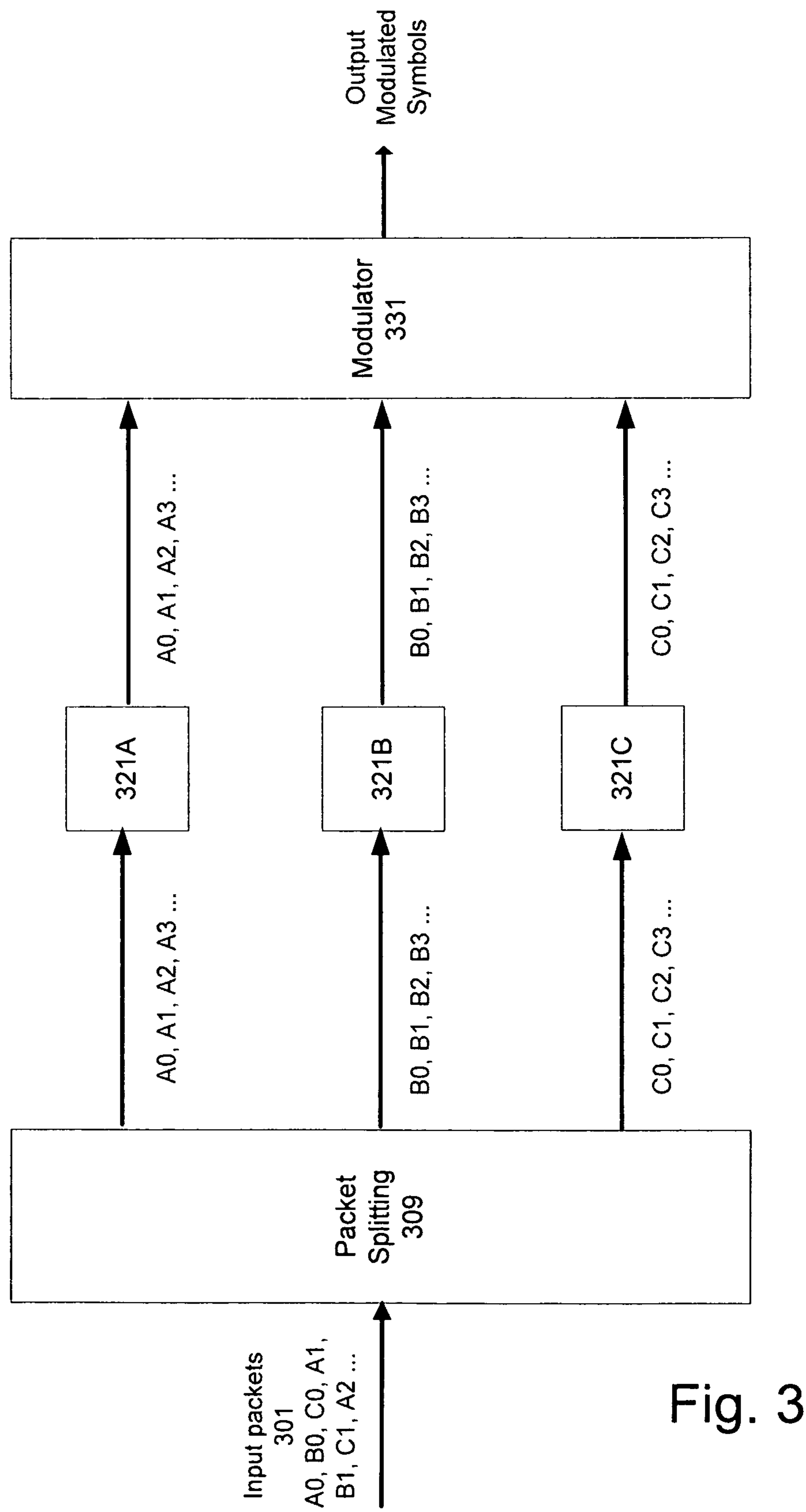
FIG. 3 is a block diagram of a transmission architecture for arranging packets of data.

FIG. 3 depicts an exemplary transmitting architecture 300. As suggested in FIG. 3, a packet of information Input Packet 301 can be split into a number of sub-packets {a, b, c, . . . }. Afterwards, each sub-packet is received by blocks 321*a*-321*c*. Blocks 321*a*-321*c* may perform a number of standard processes. For example, a Cyclic Redundancy Check (CRC) checksum, encoding, channel interleaving, sequence repetition and data scrambling. The resultant processed sub-packets may then be combined into a larger architecture (described further below), then modulated by Modulator 331 and then transmitted according to an OFDM scheme, and transmitted according to a temporal architecture of frames and super-frames.

Figure 4:
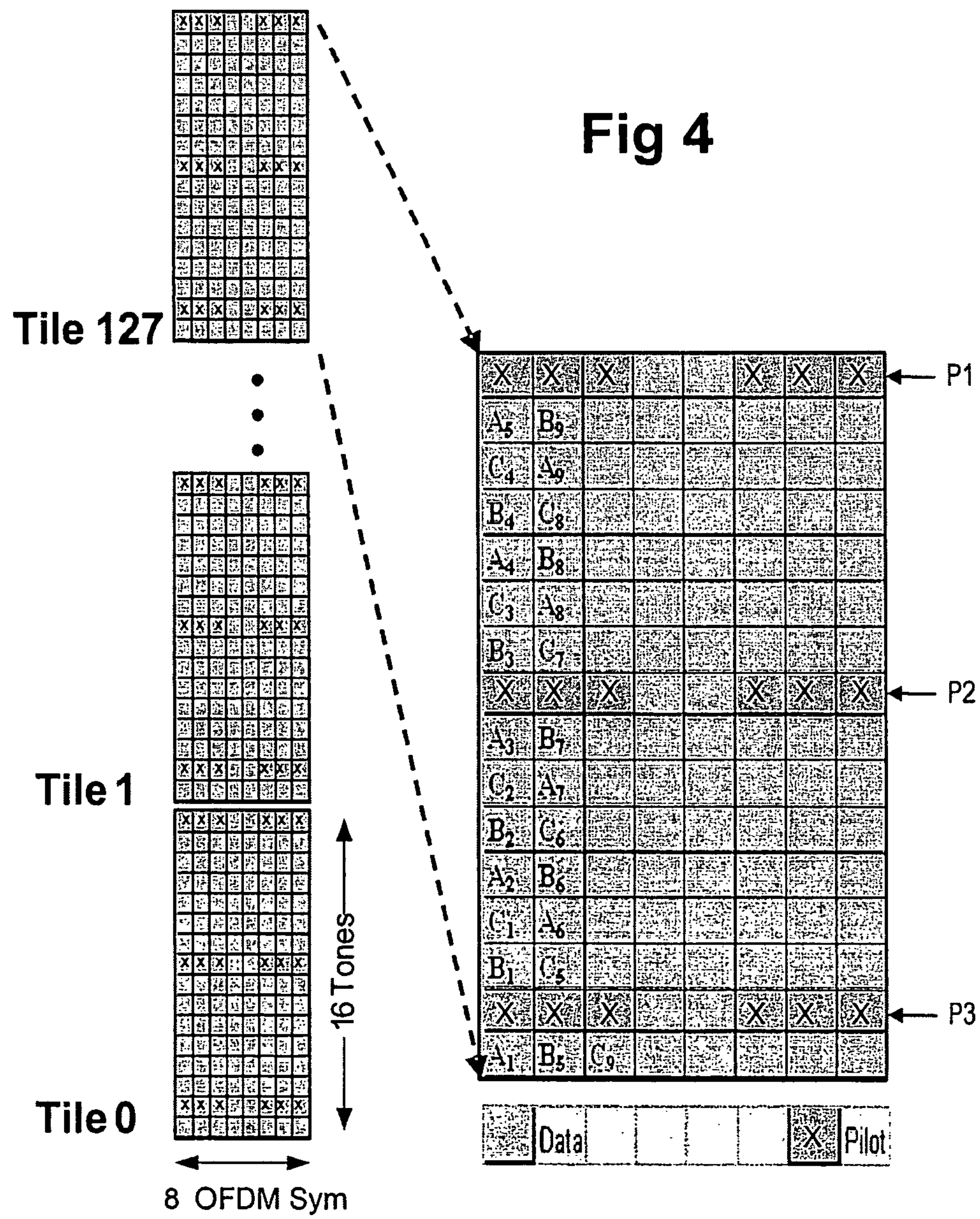
FIG. 4 depicts a logical arrangement of OFDM data.

For various blocks of data in a frame/super-frame architecture, OFDM signals and data may be organized into sub-blocks, called "tiles" in this disclosure. These tiles may be generated in the receivers shown in FIGS. 5, 6A-6B and 8A-8B. FIG. 4 shows an example of an OFDM signal broken into 128 tiles; with each tile being made from 16 separate tones (or sub-channels) over 8 OFDM symbols such that each tile may consist of as many as 128 symbols. The format of FIG. 4 shows an OFDM physical layer that provides a 3-D time-frequency-space grid that may be used according to a Block Hopping Mode where some of these tiles may are assigned to an AT.

As shown in FIG. 4, each of the various tiles can have both data symbols and pilot symbols, with data symbols being used to carry information and pilot symbols being used to perform a wide variety of tasks, some of which may be explained further below, noting that an orthogonal pilot sequence from an AP Tx antenna can allow channel and interference estimation per layer.

Again, non-pilot symbols can be occupied by data from several subpackets, where symbols from a subset of subpackets are "painted" on non-pilot tones in a round-robin fashion across one or more tiles.

Depending on a desired assignment of tiles to data, payload data may be effectively arranged. For example, in FIG. 4 tile 127 is assigned to hold three sub-packets of information {a, b, c} with sub-packet {a} containing data symbols (a0, a1, a2, a3 . . . }, sub-packet {b} containing data symbols (b0, b1, b2, b3 . . . }, and sub-packet {c} containing data symbols (c0, c1, c2, c3 . . . }. However, this arrangement of sub-packet data within a tile is exemplary and does not preclude other arrangement patterns. Note that the various symbols that are interspersed together on tile 127 in a process/format may be referred to as sub-packetization or "painting." Sub-packetization may allow for the pipelining of demodulation and decoding operations for different sub-packets. In this context, pipelining may refer to the concurrent operation of the demodulation operation on a tile while the decoding operation can happen on a sub-packet, which can span tiles that may already have been demodulated. Furthermore, it is noted that the sub-packets of information contained within the tiles shown in FIG. 4 may vary. For example, in one embodiment the tiles may contain information pertaining to demodulated data (I, Q, SNR) for each symbol/tone combination. However, in another embodiment, the tiles may contain information pertaining to channel interpolation/estimation data (for example, channel estimation coefficients).

Figure 5:
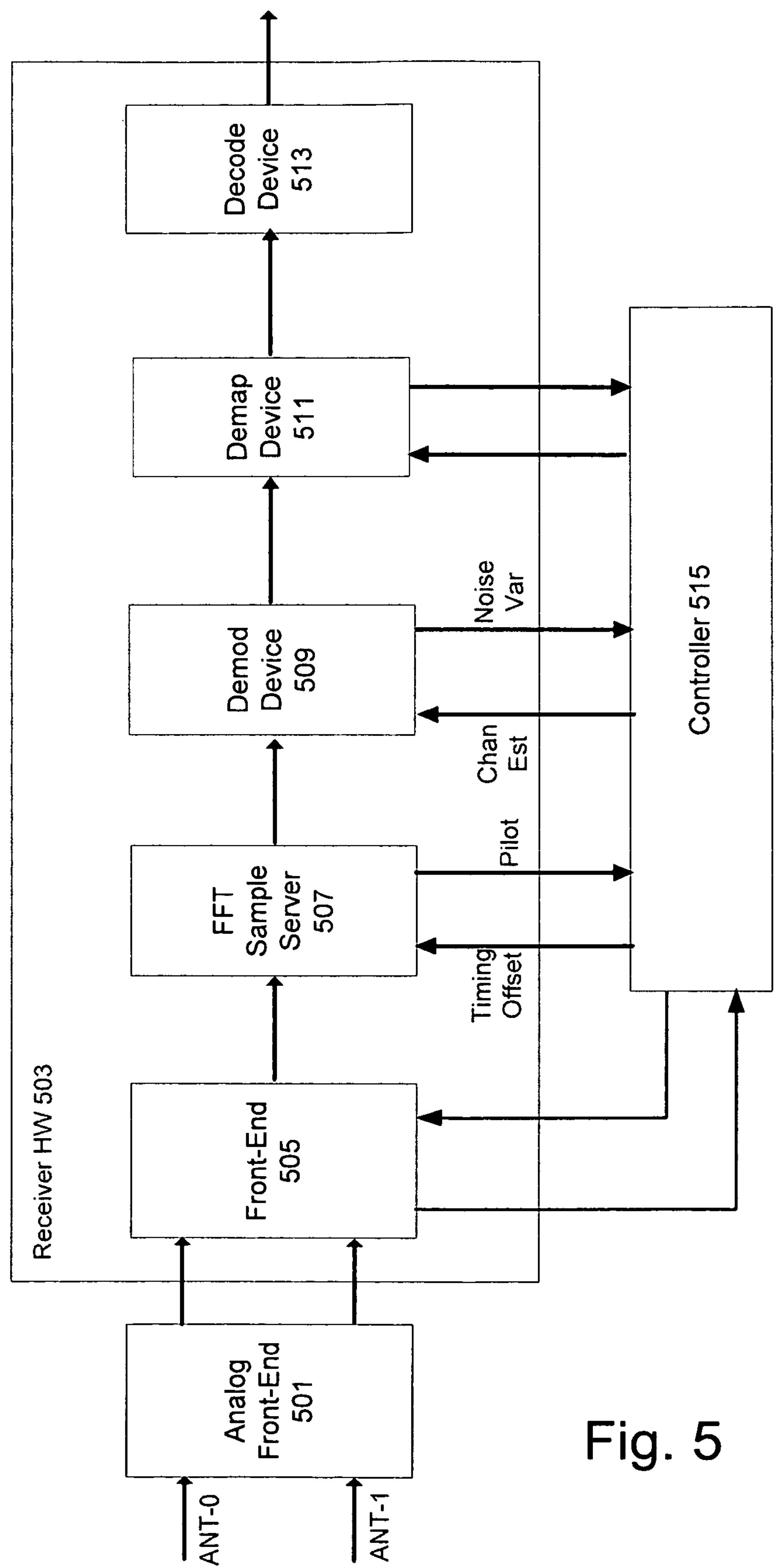
FIG. 5 depicts an exemplary hardware receiver architecture with supporting processor.

FIG. 5 depicts an exemplary hardware receiver architecture 503 with supporting processor. As shown in FIG. 5, two antennas ANT 0 and ANT 1 are shown leading to an analog front-end 501, which may perform various processes on the received signals, such as buffering, filtering, mixing and analog to digital conversion (ADC) to provide two streams of digitized data to a digital front-end of the hardware receiver architecture 505.

The digital front-end of the hardware receiver architecture 505 can process the received data including such processes, as DC offset correction, digital filtering, IQ correction, frequency correction and digital gain control. The digital front-end 505 may then provide the digitally processed data as dual data streams to the FFT sample server/engine 507, which in turn may process the OFDM data using FFTs (or DFTs) under control of Controller 515, which may be any form of sequential instruction processing machine executing software/firmware. Further, FFT sample server/engine 507 may include a sample server and a symbol buffer.

Controller 515 may perform channel estimation. It is well known that a wireless channel may introduce arbitrary time dispersion, attenuation, and phase shift in a received signal over a communications channel. Channel estimation may be used to form an estimate of the time, amplitude and/or phase shift caused by the wireless channel from the available pilot information. Channel estimation may remove the effect of the wireless channel and allows subsequent symbol demodulation. Channel estimation may be implemented by any number of different algorithms. Controller 515 receives pilot data from FFT Sample FFT sample server/engine 507. Further, Controller 515 sends channel estimation data and noise variance data to Demod Engine 509.

The FFT symbol data of the FFT sample server/engine 507 may then be provided to the Demod Engine 509, which may perform any number of demodulation operations, such as channel interpolation, Maximum Ratio Combining (MRC)/Minimum Mean Square Error (MMSE) operations, to produce dual demodulated outputs with each output arranged logically in a manner consistent with the tiles of FIG. 4. Note that each entry of each tile output by the Demod Engine 509 may include three components including a real portion (I), an complex portion (Q) and a related SNR. Further, in one embodiment a tile buffer may be positioned after the Demod Engine 509 (not shown in FIG. 5).

The outputs of the Demod Engine 509 may be further processed by Demap Engine 511 and Decode Engine 513 in manners more fully discussed below. The Demap Engine 511 may include a log-likelihood ratio (LLR) engine that can convert I, Q and SNR data to soft bits. Further, the Demap Engine 511 can reorder the data format from tile-based to packet-based. The exemplary Demap Engine 511 may include a log-likelihood ratio (LLR) engine, a sub-packetization engine, a descrambler and a de-interleaver. The LLR Engine 611*a* can be responsible for generating Log-Likelihood-Ratios, which may convey the soft information needed/useable by the Decode Engine 513. In the present embodiment, LLRs may be generated independently for two layers in MIMO arrangements. The inputs may include demodulated I, Q, and SNR data—per layer for each tone and Modulation Order. The output may include Log-Likelihood-Ratios (LLRs) for 2-bit data (QPSK), 3-bit data (8 PSK), 4-bit data (16 QAM) and/or 6-bit data (64 QAM).

The Decode Engine 513 may include an LLR Buffer, a Turbo Decoder and a Viterbi Decoder. The Decode Engine 513 performs the basic operations of a standard decoder. The Turbo Decoder may include Turbo Codes/Decoders that are high-performance error correction codes to achieve maximal information transfer over a limited-bandwidth communication link in the presence of data-corrupting noise. The Viterbi Decoder may use the Viterbi algorithm for decoding a bitstream that has been encoded using forward error correction based on a Convolutional code.

Figure 6A:
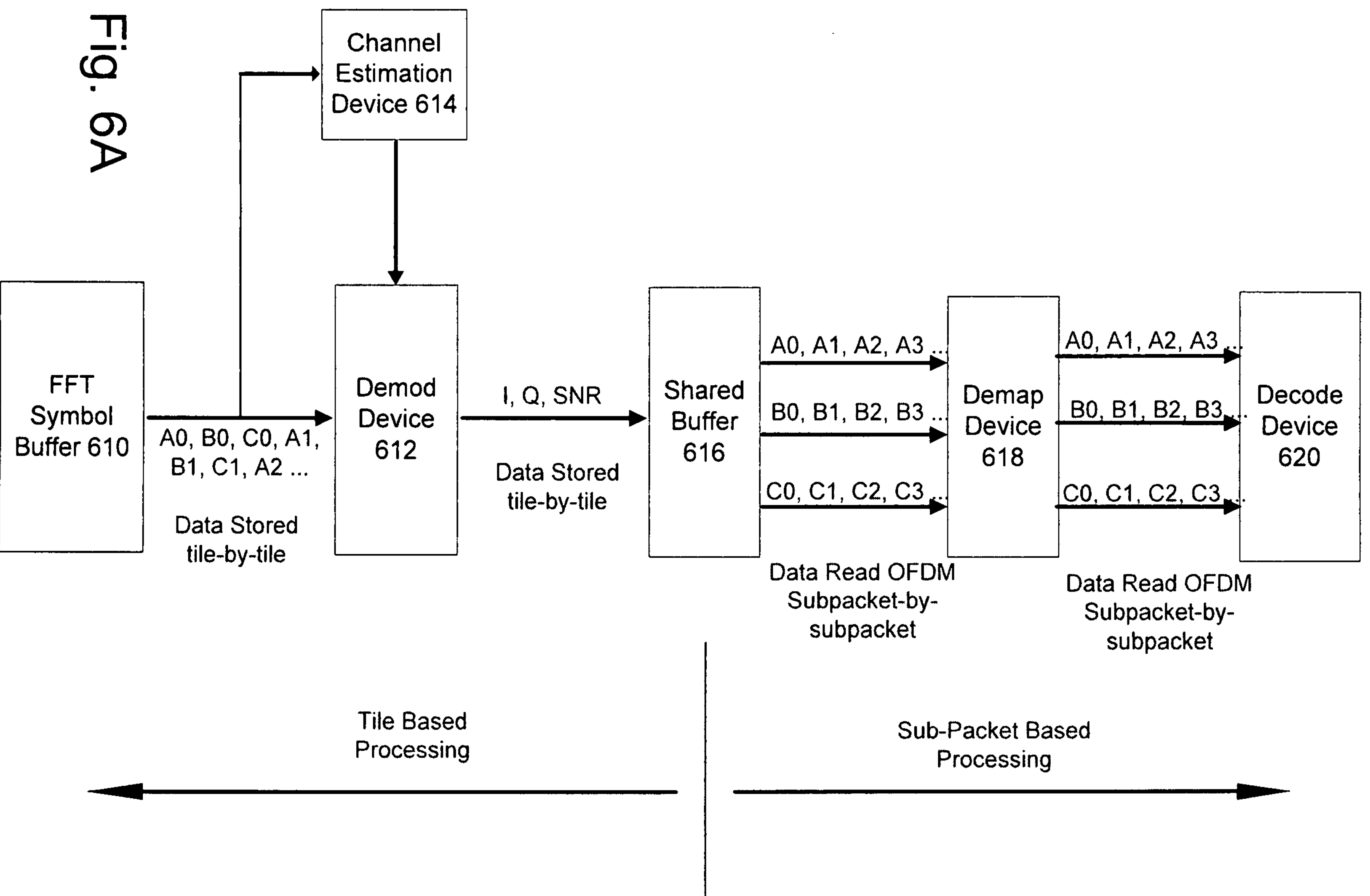
FIG. 6A depicts an exemplary architecture of a portion of the receiver device of FIG. 5 that lends itself to pipelined processing of various sub-packets to therefore increase overall processing rates.

FIG. 6A depicts an exemplary architecture of a portion of the receiver device of FIG. 5 that lends itself to pipelined processing of various sub-packets to therefore increase overall processing rates.

As shown in FIG. 6A, the exemplary receiver architecture may include an FFT symbol buffer 610, a hardware-oriented demodulator (demod) device 612, a channel estimation device 614, a shared buffer 616, a demap device 618 and a decode device 620.

In operation, the FFT symbol buffer 610 may provide OFDM symbol data to the demod device 612 and the channel estimation device 614. The channel estimation device 614 may provide channel estimates for each sub-channel of each tile of data provided by the FFT symbol buffer, and may also provide the channel estimates to the demod device 612. In an exemplary embodiment, the channel estimation device 614 performs channel estimation for each tile shown in FIG. 4, on a tile-by-tile basis. In an alternative embodiment, the channel estimation parameters for each tile are calculated such that for a given tile, the channel estimation parameters for that tile are the same. As shown in FIG. 6A, the FFT symbol buffer 610 and the channel estimation device 614 perform operations on the tiles of data tile-by-tile (tile based processing).

The demod device 612 may produce demodulated data (I, Q and SNR) to the shared buffer 616 for each tile shown in FIG. 4. As shown in FIG. 6A, the H/W demod device 612 performs operations on the tiles of data tile-by-tile (tile based processing).

The shared buffer 616 may store the demodulated tiles of data shown in FIG. 4 for each OFDM symbol and tone combination. As shown in FIG. 6A, the FFT symbol buffer 610, the channel estimation device 614 and the H/W demod device 612 perform operations on the tiles of data tile-by-tile (tile based processing). Further, the demap device 618 and decode device 620 perform operations on the contents of the shared buffer 616 on a sub-packet-by-sub-packet basis (sub-packet based processing). Thus, the shared buffer 616 may be viewed as an element that allows the processing of data from a tiled-based processing to a sub-packet based processing. In order to increase system flexibility and enhance performance, the shared buffer 616 may be decoupled from the demodulation and the decoder/demapper processing in an OFDMA system (as shown in FIG. 6A). Therefore, the demodulation results are stored in the shared buffer 616 independently of the demapper/decoder operations performed by the demap device 618 and decode device 620. Further, the shared buffer 616 allows flexibility of prioritization of the demodulation of the "blocks/tiles" of tones which might be used to trigger the decode device 620, leading to pipelining of the demodulation and the demapper/decoding operations.

The demap device 618 may convert tile-based organized data into sub-packet-based data. Thereafter, the decode device 620 and a variety of other devices may further process the sub-packet organized data. The decode device 620 may be partitioned based upon coding type. For example, in one embodiment the decode device 620 may be partitioned to handle Viterbi codes and the other portion of the decode device 620 may be partitioned to handle Turbo codes.

The device architecture of FIG. 6A reduces the complexity of standard receivers. For example, the demod device 612 and demap device 618 shown in FIG. 6A are positioned in separate positions. As a result, the devices are decoupled and may operate independently allowing for pipelined processing.

Figure 6B:
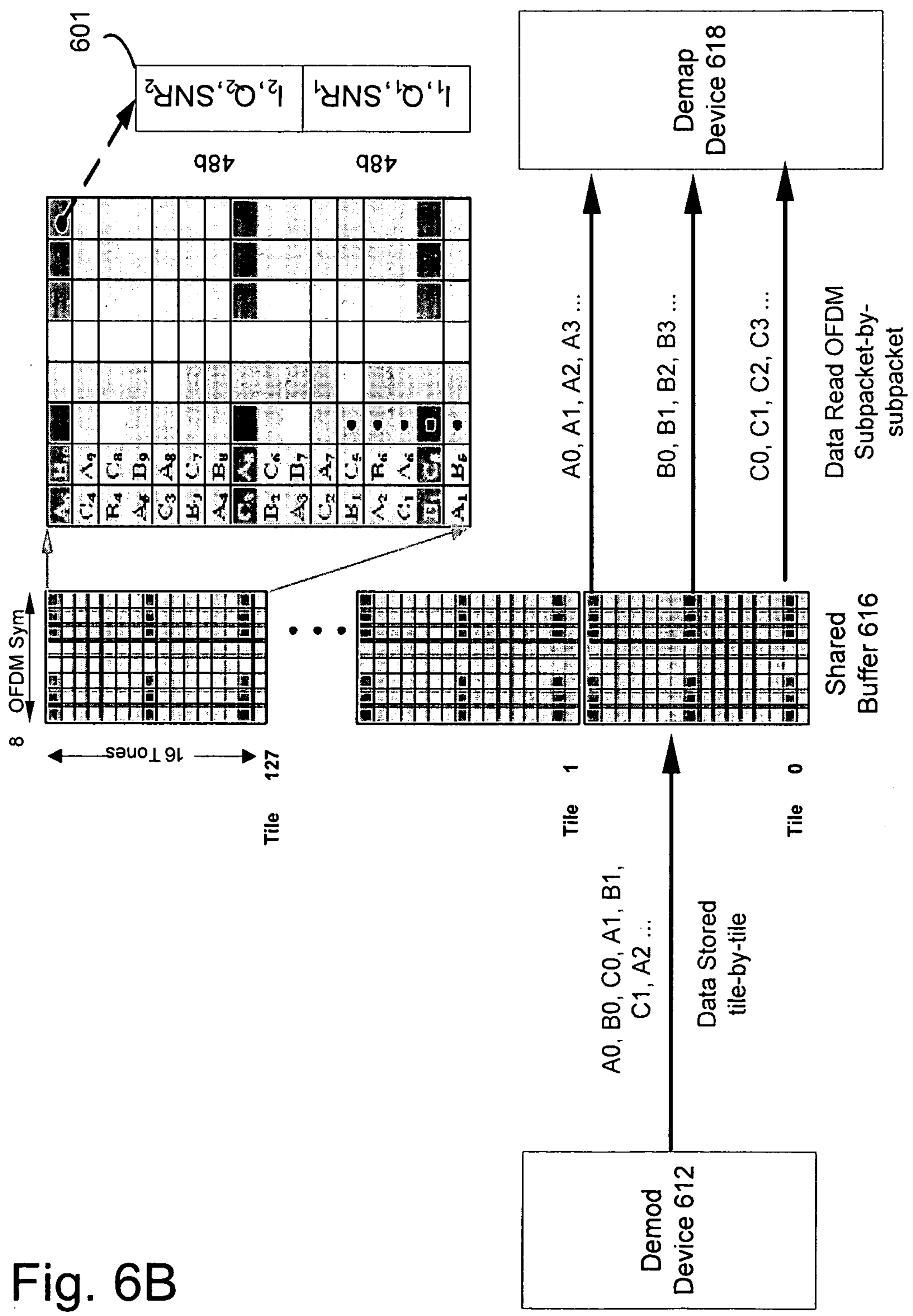
FIG. 6B depicts a portion of the exemplary receiver architecture shown in FIG. 6A.

FIG. 6B depicts a portion of the exemplary receiver architecture shown in FIG. 6A.

Demod device 612 is directly connected to the shared buffer 616. The demodulated data processed by the demod device 612 is stored in the shared buffer 616 tile-by-tile. Further, the demod device 612 processes the data received from the channel estimation device 614 and FFT symbol buffer 610 tile-by-tile. For example, data stream A0, B0, C0, A1, B1, C1, A2, . . . , is stored in the tiles shown in FIG. 6B under different tone and symbol combinations. In this exemplary embodiment, tile entry 601 contains demodulated data for any of the sub-packets (A, B, C) represented by $I_1$, $Q_1$, $SNR_1$ and $I_2$, $Q_2$, $SNR_2$. Further, the shared buffer 616 may be partitioned to include SISO and MIMO modes of operation.

The shared buffer 616 is directly connected to the demap device 618. The demap device 618 reads the data contained in the shared buffer 616 sub-packet by sub-packet. Therefore, for data pertaining to sub-packet A, the demap device 618 reads the data out for sub-packet A serially, for example, A0, A1, A2. Similarly, for data pertaining to sub-packet B, the demap device 618 reads the data out for sub-packet B serially, for example, B0, B1, B2. Similarly, for data pertaining to sub-packet C, the demap device 618 reads the data out for sub-packet C serially, for example, C0, C1, C2. The demap device 618 may include LLR, sub-packetization, descrambling of data, and deinterleaving of data. Thus, one channel may have two sets of demappers and decoders that may access information stored in the shared buffer 616 in parallel. Thus, parallel processing of the data contained in the shared buffer 616 is possible. Further, demap device 618 may also be partitioned based upon modulation type. For example, a portion of the demap device 618 may be partitioned to operate on QPSK data, while another portion of the demap device 618 may operate on 64 QAM or 16 QAM. Further, each demap device pipeline may be partitioned based upon high priority and low priority connections.

Figure 7:
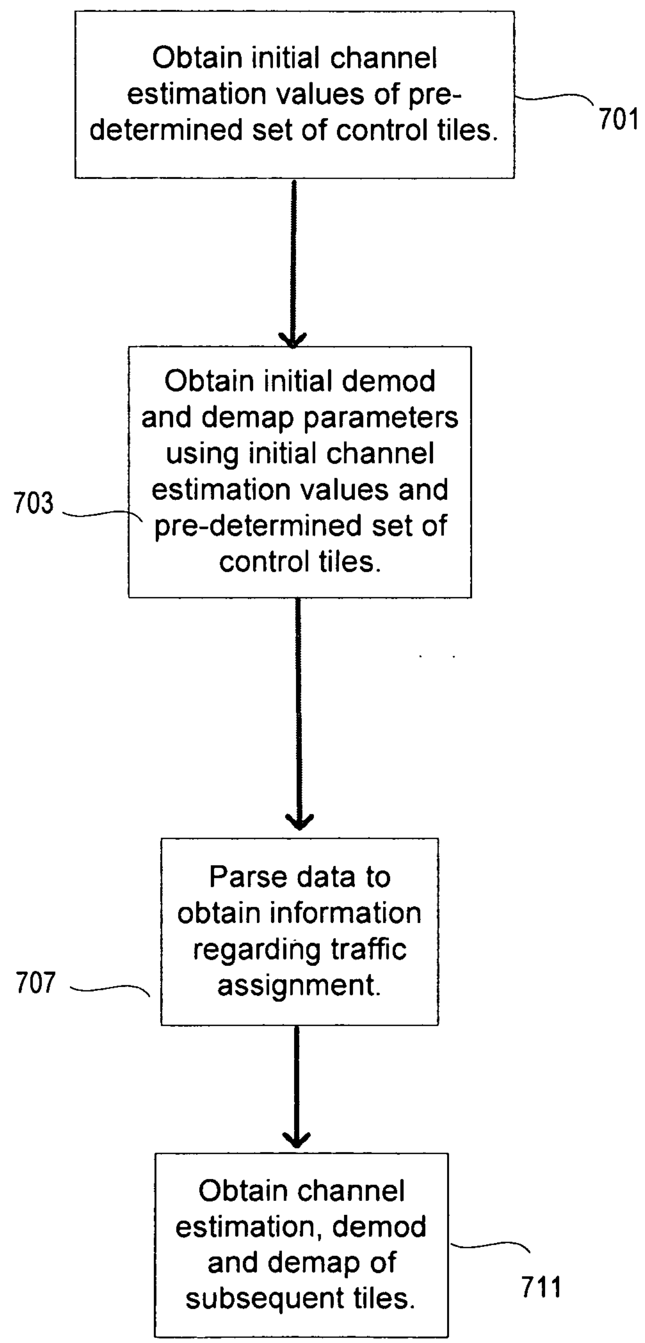
FIG. 7 depicts a flowchart that illustrates the Controller 515 portion of the exemplary hardware receiver architecture 503 of FIG. 5 in view of the receiver shown in FIGS. 6A-6B.

FIG. 7 depicts a flowchart that illustrates the Controller 515 portion of the exemplary hardware receiver architecture 503 of FIG. 5 in view of the receiver shown in FIGS. 6A-6B and FIGS. 8A-8B (discussed below).

At step 701, Controller 515 obtains the initial channel estimation values of a pre-determined set of control tiles.

At step 703, Controller 515 obtains the initial demod and demap parameters using the initial channel estimation values and the pre-determined set of control tiles.

At step 707, Controller 515 parses the packet data to obtain information regarding traffic assignment. For example, the traffic assignment may include the type of tiles that are assigned to a specific sub-packet, the type of MIMO (SIMO) that is utilized, the transmit mode that is used, the type of packets that are used, the kind of tile painting that is utilized, what tiles are assigned to each data sub-packet stream, the type of modulation that is used, the number of sub-packets that are contained within each tile, the positioning of each sub-packet within each tile, the type of beamforming that is used, etc.

At step 707, Controller 515 obtains the channel estimation, demod and demap parameters of any subsequent tiles using the information from steps 701, 703 and 705.

Figure 8A:
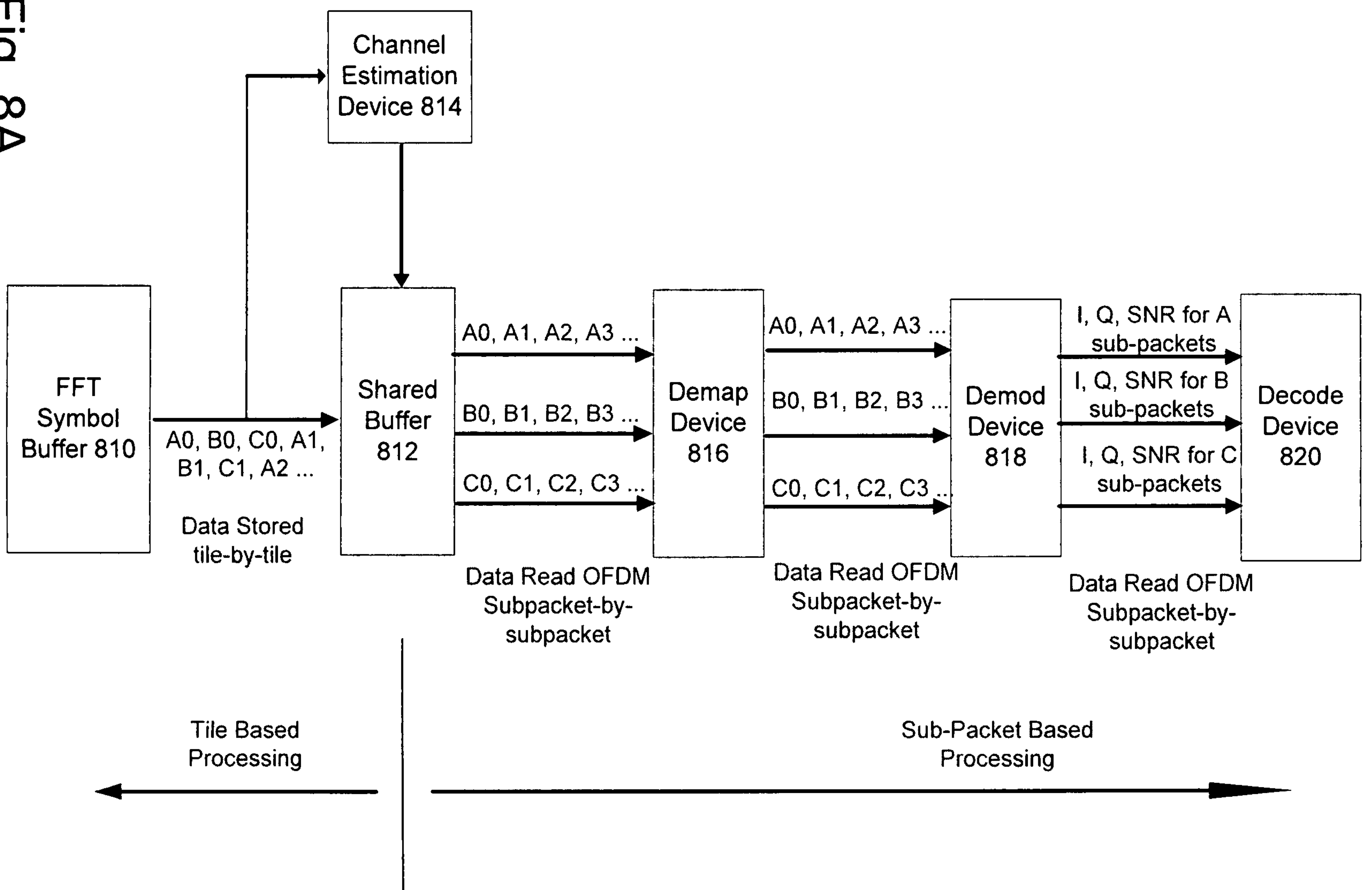
FIG. 8A depicts another variant of the Demod portion of the exemplary hardware receiver of FIG. 5.
Figure 8B:
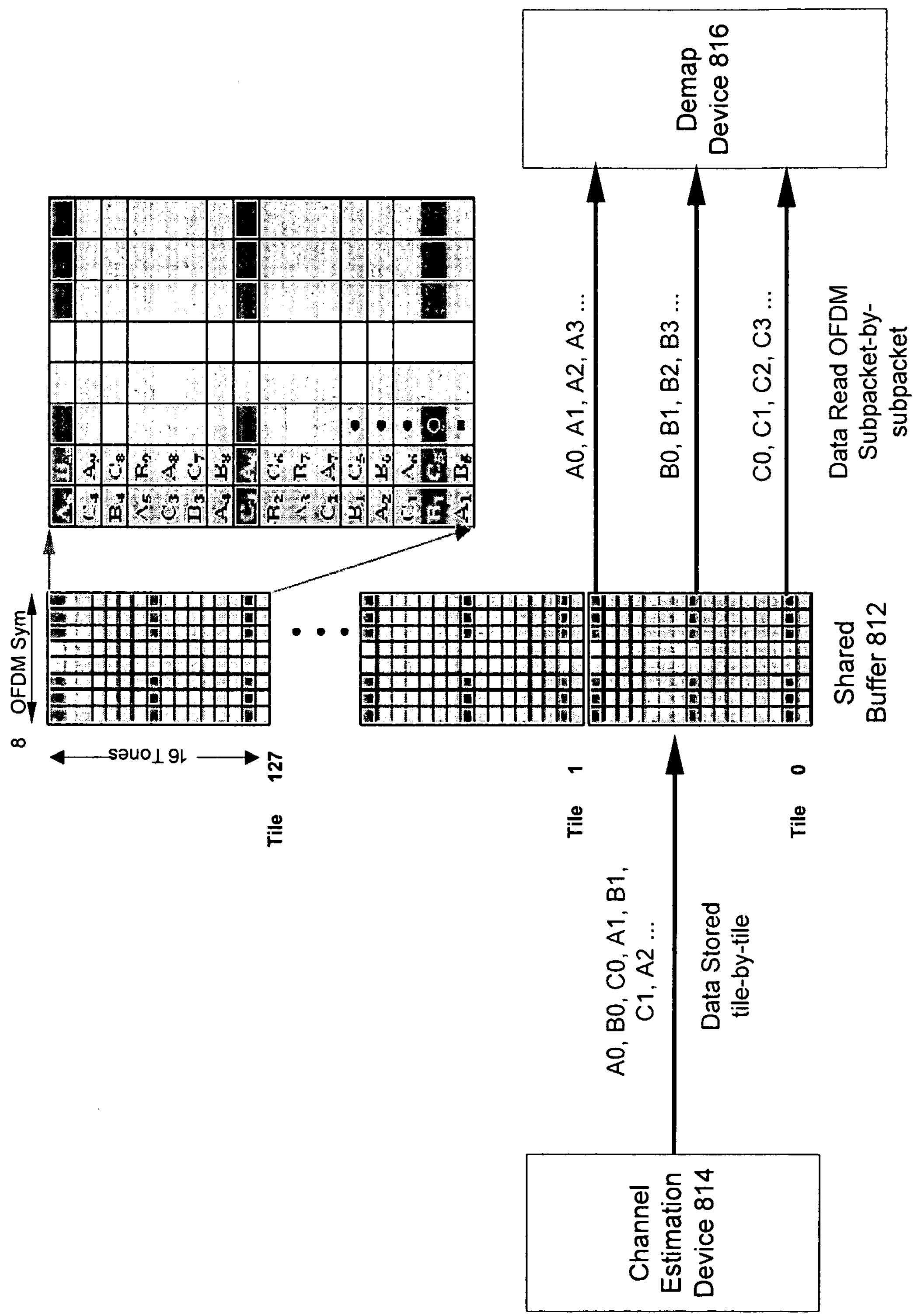
FIG. 8B depicts a portion of the exemplary receiver architecture shown in FIG. 8A.

Further, the Controller 515 portion of the exemplary hardware receiver architecture 503 of FIG. 5 implemented by the flowchart illustrated in FIG. 7 may also be utilized by the receiver architecture shown in FIGS. 8A-8B. While the order of the demod and demap operations in FIG. 8A-8B are different, the functions performed by the demod and demap can be the same for both embodiments.

FIG. 8A depicts another exemplary architecture of a portion of the receiver device of FIG. 5 that lends itself to pipelined processing of various sub-packets to therefore increase overall processing rates.

As shown in FIG. 8A, the exemplary receiver architecture may include an FFT symbol buffer 810, a channel estimation device 814, a shared buffer 812, a demap device 816 a hardware-oriented demodulator (demod) device 818 and a decode device 820.

In operation, the FFT symbol buffer 810 may provide OFDM symbol data to the channel estimation device 814 and the shared buffer 812. The channel estimation device 814 may provide channel estimates for each sub-channel of each tile of data provided by the FFT symbol buffer, and may also provide the channel estimates to the shared buffer 812. In an exemplary embodiment, the channel estimation device 814 performs channel estimation for each tile shown in FIG. 4, on a tile-by-tile basis. In an alternative embodiment, the channel estimation parameters for each tile are calculated such that for a given tile, the channel estimation parameters for that tile are the same. As shown in FIG. 8A, the FFT symbol buffer 810 and the channel estimation device 814 perform operations on the tiles of data tile-by-tile (tile based processing).

The shared buffer 812 may store the tiles of channel estimate data shown in FIG. 4 for each OFDM symbol and tone combination. As shown in FIG. 8A, the FFT symbol buffer 810 and the channel estimation device 814 perform operations on the tiles of data tile-by-tile (tile based processing). Further, the demap device 816, demod device 818 and decode device 820 perform operations on the contents of the shared buffer 812 on a sub-packet-by-sub-packet basis (sub-packet based processing). Thus, the shared buffer 812 may be viewed as an element that allows the processing of data from a tiled-based processing to a sub-packet based processing. In order to increase system flexibility and enhance performance, the shared buffer 812 may be decoupled from the demodulation and the decoder/demapper processing in an OFDMA system (as shown in FIG. 8A). Therefore, the channel estimation results are stored in the shared buffer 812 independently of the demodulation and demapper/decoder operations performed by the demap device 816, demod device 818 and decode device 820. Further, the shared buffer 812 allows flexibility of prioritization of the demodulation of the "blocks/tiles" of tones which might be used to trigger the decode device 820, leading to pipelining of the demodulation and the demapper/decoding operations. The contents of the shared buffer 812 may be used for further processing, for example, successive interference cancellation.

The demap device 816 may convert tile-based organized data into sub-packet-based data. The demod device 818 may produce on the fly demodulated data (I, Q and SNR) to the decode device 820 for selected sub-packets shown in FIG. 4. As shown in FIG. 8A, the H/W demod device 818 performs demodulation operations on the tiles of data sub-packet-by-sub-packet (sub-packet based processing). The demod device 818 may demodulate the channel estimation data stored in the shared buffer 812 on the fly. For example, for a given tone and a corresponding time, the channel estimation parameters are obtained from the shared buffer 812. Afterwards, the demod device 818 may perform demodulation of the selected tone and channel estimation on the fly sub-packet by sub-packet, as opposed to demodulating all of the channel estimation data contained in the shared buffer 812. Thereafter, the decode device 820 and a variety of other devices may further process the sub-packet organized data. The decode device 620 may be partitioned based upon coding type. For example, in one embodiment the decode device 620 may be partitioned to handle Viterbi codes and the other portion of the decode device 620 may be partitioned to handle Turbo codes.

The device architecture of FIG. 8A reduces the complexity of standard receivers. For example, the demod device 818 and demap device 816 shown in FIG. 8A are positioned in separate positions. As a result, the devices are decoupled and may operate independently allowing for pipelined processing.

FIG. 8B depicts a portion of the exemplary receiver architecture shown in FIG. 8A.

Channel estimation device 814 is directly connected to the shared buffer 812. The data processed by the channel estimation device 814 and FFT symbol buffer 810 are stored in the shared buffer 812 tile-by-tile. For example, data stream A0, B0, C0, A1, B1, C1, A2, . . . , is stored in the tiles shown in FIG. 8B under different tone and symbol combinations tile-by-tile. Further, the shared buffer 812 may be partitioned to include SISO and MIMO modes of operation.

The shared buffer 812 is directly connected to the demap device 816. The demap device 816 reads the data contained in the shared buffer 812 sub-packet by sub-packet. Therefore, for data pertaining to sub-packet A, the demap device 816 reads the data out for sub-packet A serially, for example, A0, A1, A2. Similarly, for data pertaining to sub-packet B, the demap device 816 reads the data out for sub-packet B serially, for example, B0, B1, B2. Similarly, for data pertaining to sub-packet C, the demap device 816 reads the data out for sub-packet C serially, for example, C0, C1, C2. The demap device 816 may include LLR, sub-packetization, descrambling of data, and deinterleaving of data. Further, one channel may have two sets of demappers and decoders that may access information stored in the shared buffer 812 in parallel. Thus, parallel processing of the data contained in the shared buffer 812 is possible. Further, demap device 816 may also be partitioned based upon modulation type. For example, a portion of the demap device 816 may be partitioned to operate on QPSK data, while another portion of the demap device 816 may operate on 64 QAM or 16 QAM. Further, each demap device 816 pipeline may be partitioned based upon high priority and low priority connections.

It is understood that the specific order or hierarchy of steps in the processes disclosed is part of an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, embodiments of the invention can include a computer readable media embodying methods for decoupling demodulate and demapping functions as described herein. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. An apparatus operable in a wireless communication system, the apparatus comprising:

an FFT symbol buffer feeding FFT symbol data derived from received communication signals;

a shared buffer;

a channel estimation device configured to derive intermediate data from the FFT symbol data and to input the intermediate data to the shared buffer in a plurality of tiles each having a tile form, the intermediate data arranged in the plurality of tiles at predetermined locations across multiple tiles; and a demapping device configured to extract the intermediate data from the shared buffer in sub-packet form, wherein the demapping device extracts the intermediate data in a pipeline process from the predetermined locations in the plurality of tiles stored in the shared buffer, and wherein the extraction of sub-packet form data by the demapping device is performed as soon enough tiles are available to extract the sub-packet form data to reduce overall demodulation and demapping time.

2. The apparatus of claim 1, further comprising:

a demodulation device that receives demap data in sub-packet form produced by the demapping device, which is derived from the intermediate data in tile form stored in the shared buffer, and wherein the demodulation device produces demodulation data in sub-packet form derived from the demap data.

3. The apparatus of claim 2, wherein the intermediate data includes channel estimation data of tones.

4. The apparatus of claim 3, wherein the channel estimation device provides channel estimation data of OFDM tones to the shared buffer.

5. The apparatus of claim 4, wherein the FFT symbol buffer receives OFDM communication signals.

6. The apparatus of claim 2, wherein the demapping device further extracts FFT data from the shared buffer in sub-packet form.

7. The apparatus of claim 2, wherein the demodulation device provides I, Q and SNR information to a decode device.

8. The apparatus of claim 1, further comprising:

a demodulation device that receives the intermediate data in tile form produced by the channel estimation device and produces demodulation data, derived from the intermediate data, wherein the demodulation data is stored in the shared buffer, and wherein the demapping device extracts the demodulation data from the shared buffer in sub-packet form.

9. The apparatus of claim 8, wherein the demodulation device provides I, Q and SNR information to the shared buffer.

10. A method in a wireless communication system, the method comprising:

feeding FFT symbol data derived from received communication signals, to a channel estimation device and a shared buffer, wherein the channel estimation device provides intermediate data, derived from the FFT symbol data, to the shared buffer in a plurality of tiles each having a tile form, the intermediate data arranged in the plurality of tiles at predetermined locations across multiple tiles; and providing the intermediate data from the shared buffer to a demapping device in sub-packet form wherein the extraction of sub-packet form data by the demapping device is performed in a pipeline process from the predetermined locations in the plurality of tiles stored in the shared buffer and wherein the extraction of the sub-packet form data is performed as soon enough tiles are available to extract the sub-packet form data to reduce overall demodulation and demapping operation time.

11. The method of claim 10, further comprising receiving a demap data in sub-packet form produced by the demapping device, which is derived from the intermediate data in tile form stored in the shared buffer, and producing a demodulation data in sub-packet form derived from the demap data.

12. The method of claim 11, wherein the intermediate data includes channel estimation data of tones.

13. The method of claim 12, wherein the channel estimation device provides channel estimation data of OFDM tones to the shared buffer.

14. The method of claim 11, wherein the demapping device further extracts FFT data from the shared buffer in sub-packet form.

15. The method of claim 11, wherein the demodulation device provides I, Q and SNR information to a decode device.

16. The method of claim 10, further comprising receiving the intermediate data in tile form produced by the channel estimation device and producing demodulation data, derived from the intermediate data, wherein the demodulation data is stored in the shared buffer, and wherein the demapping device extracts the demodulation data from the shared buffer in sub-packet form.

17. The method of claim 16, wherein the demodulation device provides I, Q and SNR information to a decode device.

18. A non-transitory computer-readable medium having instructions, which when executed by at least one processor, operates to provide processing of communication signals, the non-transitory computer-readable medium comprising:

instructions to feed FFT symbol data derived from received communication signals, to a channel estimation device and a shared buffer, wherein the channel estimation device provides intermediate data, derived from the FFT symbol data, to the shared buffer in a plurality of tiles each having a tile form, the intermediate data arranged at in the plurality of tiles predetermined locations across multiple tiles; and instructions to provide the intermediate data from the shared buffer to a demapping device in sub-packet form wherein the extraction of the sub-packet form data by the demapping device is performed in a pipeline process from the predetermined locations in the plurality of tiles stored in the shared buffer and wherein the extraction of the sub-packet form data is performed as soon enough tiles are available to extract the sub-packet form data to reduce overall demodulation and demapping operation time.

19. The non-transitory computer-readable medium of claim 18, further comprising:

instructions to receive a demap data in sub-packet form produced by the demapping device, which is derived from the intermediate data in tile form stored in the shared buffer, and producing a demodulation data in sub-packet form, derived from the demap data.

20. The non-transitory computer-readable medium of claim 19, wherein the intermediate data includes channel estimation data of tones.

21. The non-transitory computer-readable medium of claim 20, wherein the channel estimation device provides channel estimation data of OFDM tones to the shared buffer.

22. The non-transitory computer-readable medium of claim 21, wherein the received communication signals include OFDM communication signals.

23. The non-transitory computer-readable medium of claim 19, wherein the demapping device further extracts FFT data from the shared buffer in sub-packet form.

24. The non-transitory computer-readable medium of claim 19, wherein the demodulation device provides I, Q and SNR information to a decode device.

25. The non-transitory computer-readable medium of claim 18, further comprising:

instructions to receive the intermediate data in tile form produced by the channel estimation device and producing demodulation data, derived from the intermediate data, wherein the demodulation data is stored in the shared buffer, and wherein the demapping device extracts the demodulation data from the shared buffer in sub-packet form.

26. The non-transitory computer-readable medium of claim 25, wherein the demodulation device provides I, Q and SNR information to a decode device.

27. An apparatus in a wireless communication system, the apparatus comprising:

means for feeding FFT symbol data derived from received communication signals, to a channel estimation device and a shared buffer, wherein the channel estimation device provides intermediate data, derived from the FFT symbol data, to the shared buffer in a plurality of tiles each having a tile form, the intermediate data arranged in the plurality of tiles at predetermined locations across multiple tiles; and means for providing the intermediate data from the shared buffer to a demapping device in sub-packet form wherein the extraction of sub-packet form data by the demapping device is performed in a pipeline process from the predetermined locations in the plurality of tiles stored in the shared buffer and wherein the extraction of the sub-packet form data is performed as soon enough tiles are available to extract the sub-packet form data to reduce overall demodulation and demapping operation time.

28. The apparatus of claim 27, further comprising means for receiving a demap data in sub-packet form produced by the demapping device and derived from the intermediate data in tile form stored in the shared buffer, and producing a demodulation data in sub-packet form, derived from the demap data.

29. The apparatus of claim 28, wherein the intermediate data includes channel estimation data of tones.

30. The apparatus of claim 29, wherein the channel estimation device provides channel estimation data of OFDM tones to the shared buffer.

31. The apparatus of claim 30, wherein the received communication signals include OFDM communication signals.

32. The apparatus of claim 28, wherein the demapping device further extracts FFT data from the shared buffer in sub-packet form.

33. The apparatus of claim 28, wherein the demodulation device provides I, Q and SNR information to a decode device.

34. The apparatus of claim 27, further comprising means for receiving the intermediate data in tile form produced by the channel estimation device and producing demodulation data, derived from the intermediate data, wherein the demodulation data is stored in the shared buffer, and wherein the demapping device extracts the demodulation data from the shared buffer in sub-packet form.

35. The apparatus of claim 34, wherein the demodulation device provides I, Q and SNR information to a decode device.

* * * * *